(12) United States Patent
Nakamura et al.

(10) Patent No.: US 8,781,518 B2
(45) Date of Patent: Jul. 15, 2014

(54) COMMUNICATION DEVICE

(75) Inventors: Sakiko Nakamura, Gifu (JP); Jun Kitakado, Gifu (JP); Takaaki Makita, Gifu (JP)

(73) Assignee: Kyocera Corporation, Kyoto (JP)

( * ) Notice: Subject to any disclaimer, the term of this patent is extended or adjusted under 35 U.S.C. 154(b) by 306 days.

(21) Appl. No.: 13/326,268

(22) Filed: Dec. 14, 2011

(65) Prior Publication Data
US 2012/0149426 A1  Jun. 14, 2012

(30) Foreign Application Priority Data

Dec. 14, 2010 (JP) .................................. 2010-278290

(51) Int. Cl.
*H04W 52/24* (2009.01)
(52) U.S. Cl.
USPC .......... 455/522; 455/69; 455/63.4; 455/67.11

(58) Field of Classification Search
USPC ........... 455/522, 69, 63.4, 562.1, 90.3, 67.11, 455/66.1, 574, 343.1
See application file for complete search history.

(56) References Cited

U.S. PATENT DOCUMENTS

2005/0036441 A1\*  2/2005  Laroia et al. .................. 370/203
2005/0266799 A1\*  12/2005  Hara et al. .................... 455/63.4

\* cited by examiner

*Primary Examiner* — John J Lee
(74) *Attorney, Agent, or Firm* — Duane Morris LLP

(57) ABSTRACT

A communication device and method are disclosed. Transmitted signals are transmitted from antennas. A beam is formed based on known-received signals by controlling a transmission directionality of the antennas. Transmitted power of the transmitted signals is controlled based on a time interval between a reception time during which the known-received signals are received and a transmission time during which the transmitted signals are transmitted.

19 Claims, 14 Drawing Sheets

Figure 4

| Configuration number | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

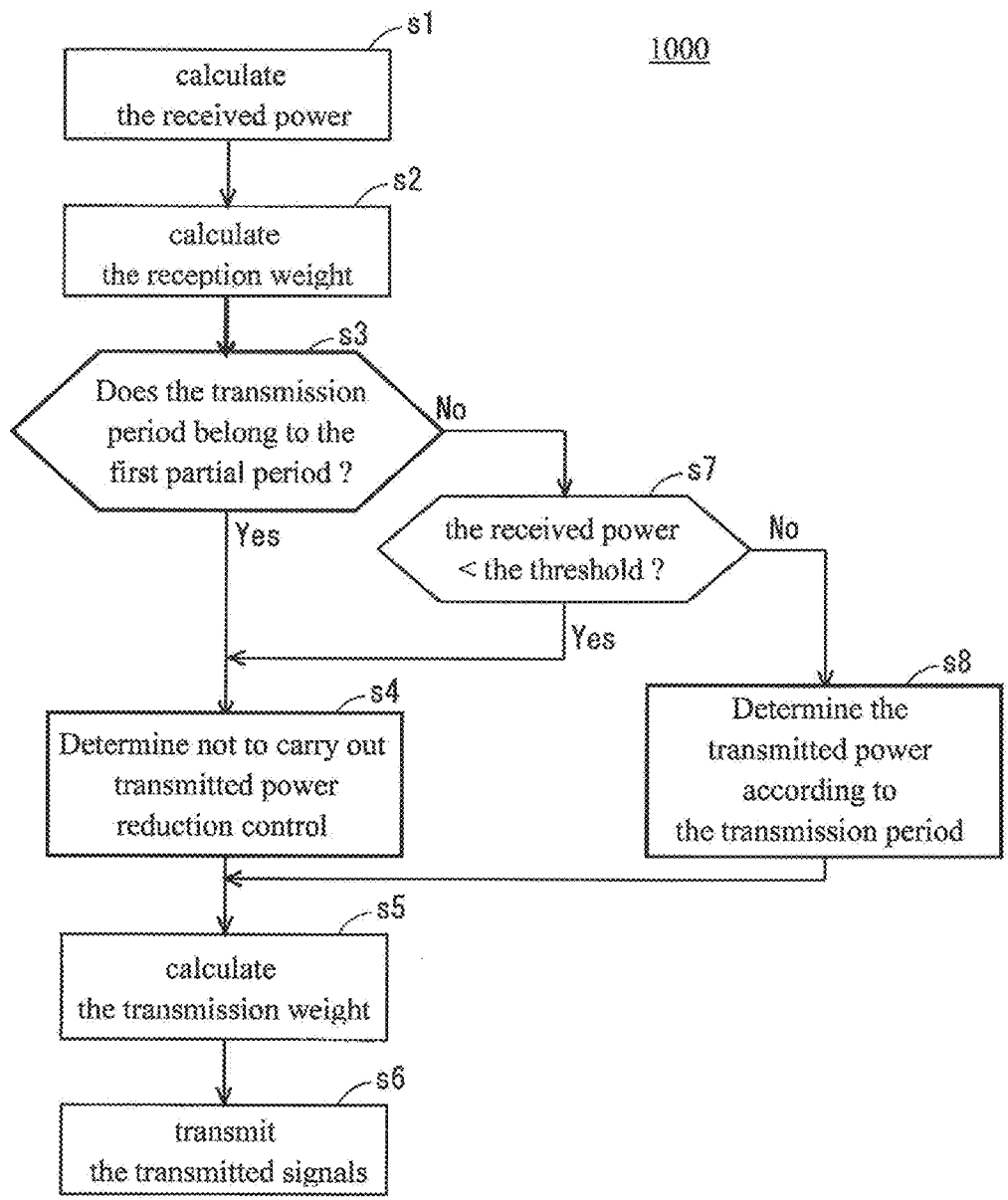

Figure 11

| Transmission period | Received Power | Transmitted power |
|---|---|---|
| First partial period | – | W0( as is ) |
| Second partial period | Equal or higher than the threshold | ( 3／4 ) × W0 |
| | Lower than the threshold | W0( as is ) |
| Third partial period | Equal or higher than the threshold | ( 2／4 ) × W0 |
| | Lower than the threshold | W0( as is ) |
| Fourth partial period | Equal or higher than the threshold | ( 1／4 ) × W0 |
| | Lower than the threshold | W0( as is ) |

Figure 14

| Transmission period | Received Power | Transmitted power |
| --- | --- | --- |
| First partial period | – | W0( as is ) |
| Second partial period | Equal or higher than the first threshold | (3/4) × W0 |
| | Lower than the first threshold | W0( as is ) |
| Third partial period | Equal or higher than the second threshold | (2/4) × W0 |
| | Lower than the second threshold | W0( as is ) |
| Fourth partial period | Equal or higher than the third threshold | (1/4) × W0 |
| | Lower than the third threshold | W0( as is ) |

US 8,781,518 B2

COMMUNICATION DEVICE

CROSS-REFERENCE TO RELATED APPLICATION

The present application claims priority under 35 U.S.C. §119 to Japanese Patent Application No. 2010-278290, filed on Dec. 14, 2010, entitled "COMMUNICATION DEVICE, AND METHOD FOR COMMUNICATION". The content of which is incorporated by reference herein in its entirety.

FIELD

Embodiments of the present disclosure relate generally to communication devices, and more particularly relate to a mobile electronic device comprising multiple antennas.

BACKGROUND

Some communication systems use an adaptive array antenna method to control a directionality of an array antenna comprising multiple antennas. A base station can transmit signals to a destination mobile phone via an adaptive array antenna so as to mitigate interference with other mobile phones. The base station forms antenna beams (beam forming) from the adaptive array antenna to direct transmission signals to the destination mobile phone during transmission.

The antenna beams are formed based on known-received signals from the mobile phone. If the timing in which the known signals are received and the timing in which the signals are transmitted by performing beam forming based on the known-received signals are distant from each other, an accuracy of the beam forming decreases at the base station. As a result, interference can be caused at other mobile phones.

SUMMARY

A communication device and method are disclosed. Transmitted signals are transmitted from antennas. A beam is formed based on known-received signals by controlling a transmission directionality of the antennas. Transmitted power of the transmitted signals is controlled based on a time interval between a reception time during which the known-received signals are received and a transmission time during which the transmitted signals are transmitted.

In an embodiment, a communication device comprises a plurality of antennas operable to transmit a plurality of transmitted signals. A communication module is operable to form a beam based on known-received signals by controlling a transmission directionality of the antennas. A transmission power control module is operable to control a transmitted power of the transmitted signals transmitted from the antennas based on a time interval between a reception time during which the known-received signals are received and a transmission time during which the transmitted signals are transmitted.

In another embodiment, a communication method for communicating using a plurality of antennas transmits a plurality of transmitted signals from the antennas. The method further forms a beam based on known-received signals by controlling a transmission directionality of the antennas. The method then controls a transmitted power of the transmitted signals transmitted from the antennas based on a time interval between a reception time during which the known-received signals are received and a transmission time during which the transmitted signals are transmitted.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 4 is an illustration of an exemplary table showing seven sub-frame configurations.

FIG. 10 is an illustration of an exemplary flowchart showing a communication process performed by a base station according to an embodiment of the disclosure FIG. 11 is an illustration of an exemplary table showing a relationship between a transmission period, a received power, and a transmitted power.

FIG. 14 is an illustration of an exemplary table showing a relationship between a transmission period, a received power, and a transmitted power.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a communication between a mobile communication device such as a mobile phone and a base station. Embodiments of the disclosure, however, are not limited to such base station-mobile communication, and the techniques described herein may be utilized in other applications. For example, embodiments may be applicable to relay stations, wireless modems, digital music players, personal digital assistance (PDA), personal handy phone system (PHS), lap top computers, TV's, GPS's or navigation systems, pedometers, health equipment, display monitors, and other communication device.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
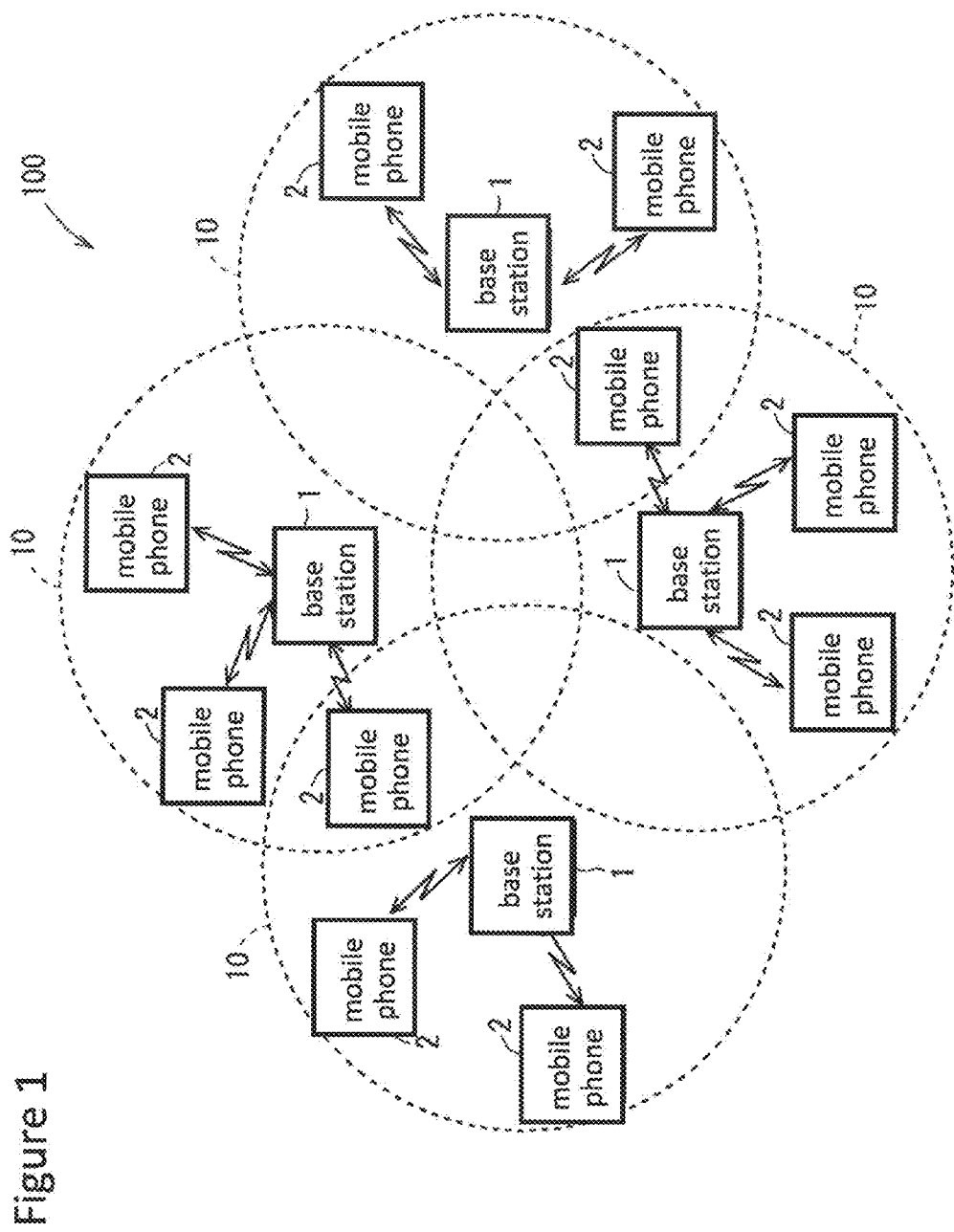
FIG. 1 is an illustration of an exemplary diagram showing a communication environment according to an embodiment of the present disclosure.

FIG. 1 is an illustration of an exemplary diagram showing a communication environment 100 according to an embodiment of the present disclosure. The communication environment 100 may comprise a plurality of base stations 1 and a plurality of mobile phones 2. The base stations 1 and the mobile phone 2 may communicate via communication channels that support standards communication protocols such as, but without limitation, Long Term Evolution (LTE) in which a Time Division Duplexing (TDD) method is used as a duplex operation, or other communication protocol.

In the LTE, an Orthogonal Frequency Division Multiple Access (OFDMA) modulation scheme can be used with downlink communication and Single Carrier-Frequency Division Multiple Access (SC-FDMA) modulation scheme can be used with uplink communication. For example, the OFDMA modulation scheme can be used for transmission from the base stations 1 to mobile phones 2, and the SC-FDMA modulation scheme can be used for transmission from mobile phones 2 to the base station 1. With the OFDMA modulation scheme, Orthogonal Frequency Division Multiplexing (OFDM) signals are used in which a plurality of subcarriers are synthesized perpendicular to each other.

As shown in FIG. 1, a service area 10 of each base station 1 partially overlaps the service area 10 of a neighboring base station 1. The base stations 1 are coupled to a network and can communicate with each other through the network. A server device may be coupled to the network and each base station 1 can communicate with the server device through the network.

Figure 2:
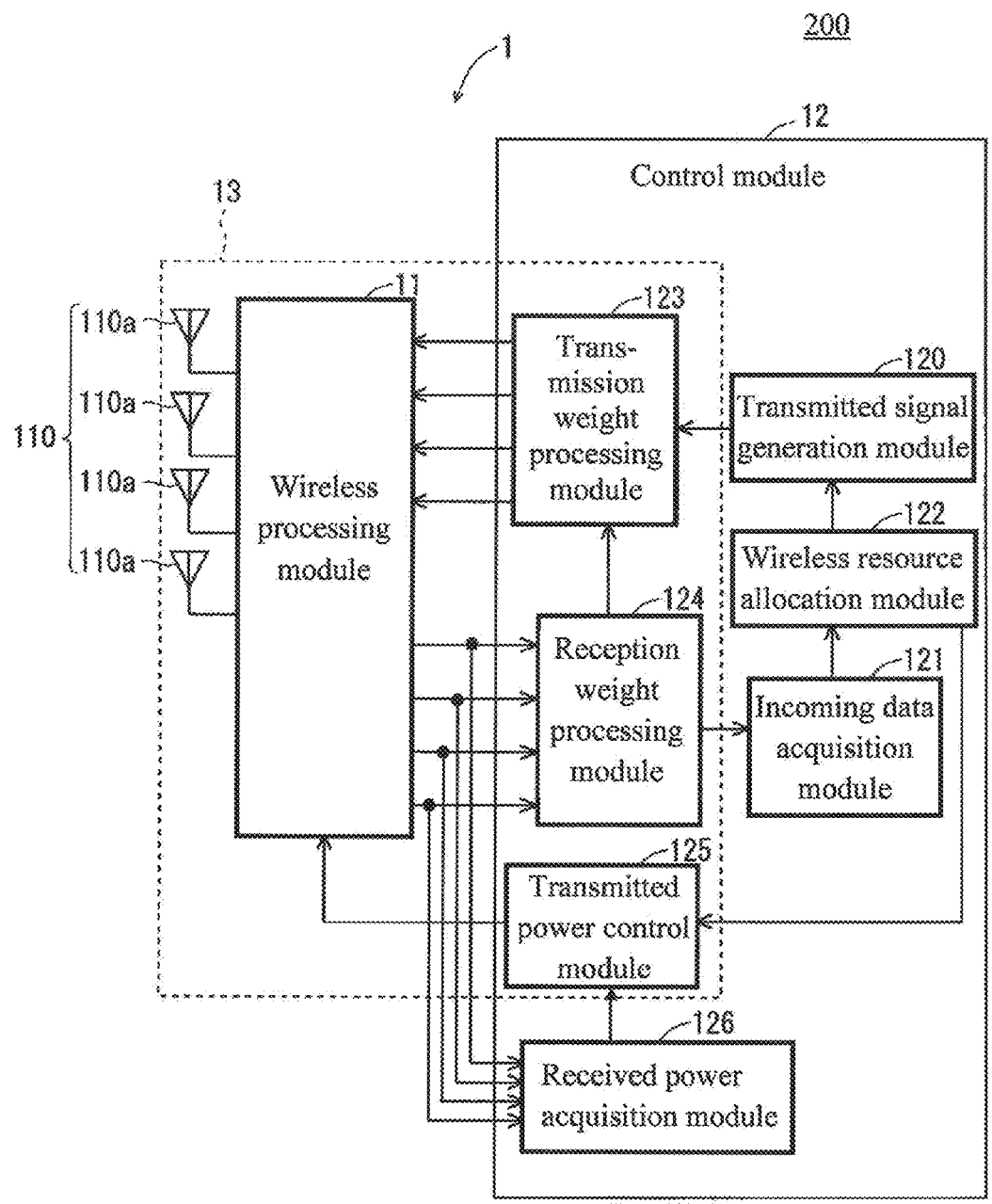
FIG. 2 is an illustration of an exemplary functional block diagram of a base station according to an embodiment of the present disclosure.

FIG. 2 is an illustration of an exemplary functional block diagram 200 (system 200) of the base station 1 according to an embodiment of the present disclosure. The base station 1 individually allocates wireless resources specified in 2-dimensions comprising a time axis and a frequency axis to each of the plurality of mobile phones 2. The base station 1 simultaneously communicates with the plurality of mobile phones 2 using the wireless resources allocated to each of the mobile phones 2. The base station 1 comprises an array antenna 110 as a transmitting and receiving antenna. The base station 1 can control the directionality of the array antenna using adaptive array antenna.

The base station 1 comprises a wireless processing module 11 and a control module 12 that controls the wireless processing module 11. The wireless processing module 11 comprises an array antenna 110 comprising a plurality of antennas 110a. The wireless processing module 11 can generate a plurality of received baseband signals by performing amplification processing, down-conversion, analog to digital (A/D) conversion processing, etc., with respect to each of the plurality of received signals received at the array antenna 110. The wireless processing module 11 can output the plurality of received baseband signals.

The wireless processing module 11 can generate a plurality of transmitted signals of a transport bandwidth by performing Digital to analog (D/A) conversion processing, up-conversion, amplification processing, etc., with respect to each of the plurality of transmitted baseband signals generated at the control module 12. The wireless processing module 11 inputs the generated transmitted signals of the transport bandwidth to each of the antennas 110a of the array antenna 110. The transmitted signals are accordingly wirelessly transmitted from each of the antenna 110a.

The control module 12 comprises a Central Processing Unit (CPU), a Digital Signal Processor (DSP), a memory, etc. The control module 12 further comprises a transmitted signal generation module 120, an incoming data acquisition module 121, a wireless resource allocation module 122, a transmission weight processing module 123, a reception weight processing module 124, a transmitted power control module 125, and a received power acquisition module 126.

The transmitted signal generation module 120 can generate transmit data that should be transmitted to the mobile phone 2 which is the target or destination mobile phone. The transmitted signal generation module 120 can generate transmitted baseband signals comprising the generated transmit data. A number of the generated transmitted baseband signals may be same as a number of antennas 110a of the array antenna 110.

The transmission weight processing module 123 sets a transmission weight for controlling the transmission directionality at the array antenna 110, for each of the transmitted signals generated at the transmitted signal generation module 120 respectively. The transmission weight processing module 123 outputs the transmitted signals to the wireless processing module 11 after performing Inverse Discrete Fourier Transform (IDFT), and other signal processing, to each of the plurality of transmitted signals in which the transmission weight is set.

The reception weight processing module 124 sets the reception weight for controlling the reception directionality at the array antenna 110 of the respective received signals, after performing Discrete Fourier Transform (DFT) on the received signals input from the wireless processing module 11. The reception weight processing module 124 generates new received signals by synthesizing each of the received signals to which the reception weight is set.

The incoming data acquisition module 121 acquires control data, user data, and other data, comprised in the received signals by performing IDFT, demodulation processing, and other signal processing, of the received signals generated at the reception weight processing module 124.

The transmitted power control module 125 is operable to control a transmitted power of the transmitted signals transmitted from the array antenna 110 based on a time interval between a reception time during which the known-received signals are received and a transmission time during which the transmitted signals are transmitted. The transmitted power control module 125 is also controls the transmitted power such that the transmitted power reduces as the time interval increases.

The wireless processing module 11 comprises a plurality of transmission amplifiers that can amplify each of the transmitted signals output from the transmission weight processing module 123. The transmitted power control module 125 controls the transmitted power of the transmitted signals transmitted from each of the antennas 110a by controlling the amplification factor of the transmission amplifiers.

The received power acquisition module 126 calculates the received power of the known-received signals received at the array antenna 110.

The communication module 13 forms a beam based on known-received signals by controlling a transmission directionality of the array antenna 110. The communication module 13 communicates with the mobile phones 2 by appropriately controlling a directionality of the array antenna 110 by means of the wireless processing module 11, the transmission weight processing module 123, the reception weight processing module 124, and the transmitted power control module 125.

The communication module 13 controls both the reception directionality and transmission directionality of the array antenna 110 when communicating with the mobile phones 2. At the reception weight processing module 124, the communication module 13 sets beams and nulls of the reception directionality at the array antenna 110 into various directions by adjusting the reception weight multiplied to the received signals. At the transmission weight processing module 123, the communication module 13 sets beams and nulls of the transmission directionality at the array antenna 110 into various directions by adjusting the transmission weight multiplied to the transmitted signals. The transmission weight may be taken from the reception weight. The reception weight may be calculated based on the known-received signals from the mobile phones 2.

The wireless resource allocation module 122 allocates the downlink wireless resource (transmission frequencies and transmission time zone) used when transmitting data to each mobile phone 2, which is the communication target. The transmitted signal generation module 120 generates the transmitted signals for the mobile phones 2 based on the downlink wireless resources the wireless resource allocation module 122 allocates to the mobile phones 2, and inputs the transmitted signals to the transmission weight processing module 123 based on the transmission time zone of the downlink wireless resource. Accordingly, the transmitted signals that should be transmitted to the mobile phones 2 are transmitted from the communication module 13 using the downlink wireless resources allocated to the mobile phones 2.

The wireless resource allocation module 122 allocates the uplink wireless resources used when each mobile phone 2 transmits to the base station 1, with respect to each mobile phone 2, which is the communication target/destination mobile phone. The transmitted signal generation module 120 generates and outputs the transmitted signals for notifying the mobile phone 2 of the uplink wireless resources that the wireless resource allocation module 122 allocates to the mobile phone 2. Accordingly, the mobile phone 2 is able to know the uplink wireless resource used for transmitting to the base station 1 and transmits the signals to the base station 1 using the uplink wireless resource.

Figure 3:
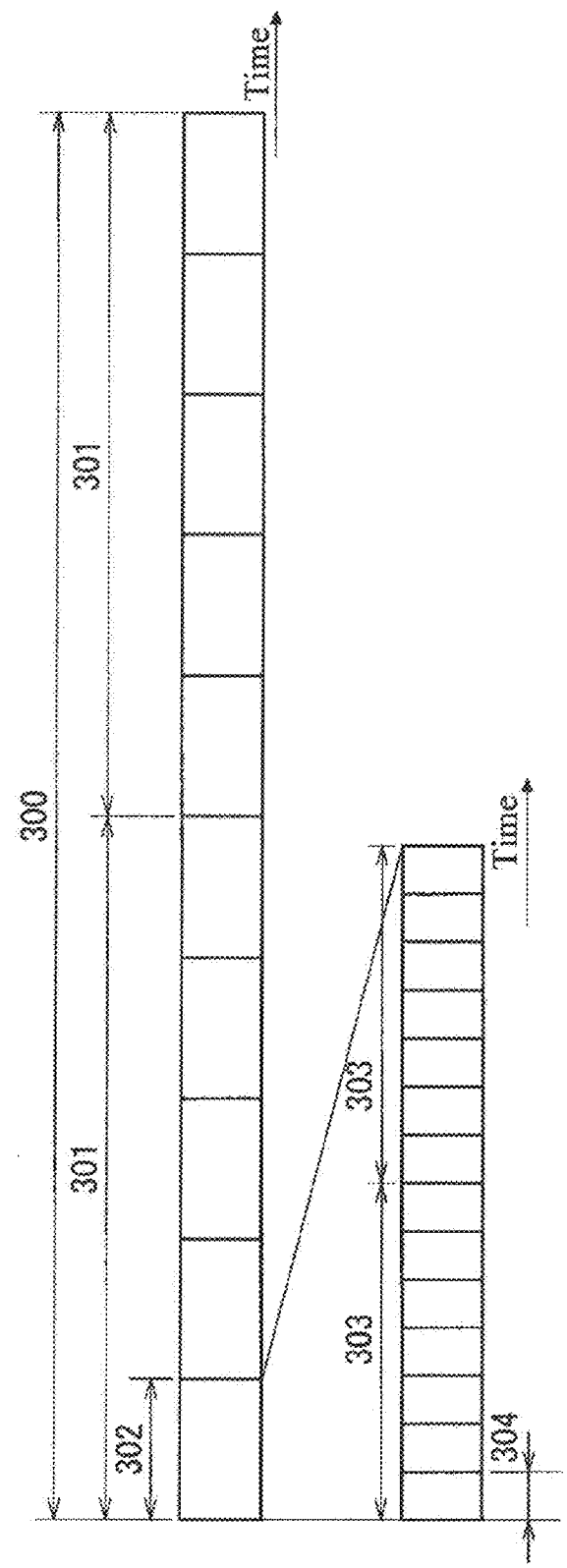
FIG. 3 is an illustration of a Time Division Duplexing (TDD) frame.

FIG. 3 is an illustration of a Time Division multiplexing (TDD) frame 300. The TDD frame 300 is used between the base station 1 and the mobile phones 2. The TDD frame 300 is specified in 2-dimensions comprising a time axis and a frequency axis. The frequency bandwidth (system bandwidth) of the TDD frame 300 is, for example, about 20 MHz, and the duration of the TDD frame 300 is, for example, about 10 ms. The wireless resource allocation module 122 can determine the uplink wireless resource and the downlink wireless resource allocated to each mobile phone 2 based on the TDD frame 300.

As shown in FIG. 3, the TDD frame 300 comprises two half-frames 301. The half-frame 301 comprises five sub-frames 302. That is, the TDD frame 300 comprises ten sub-frames 302. The duration of the sub-frames 302 may be about 1 ms. The ten sub-frames 302 comprising the TDD frame 300 may be referred to as 0th to 9th sub-frames 302, respectively, in order from the foremost sub-frame.

Each sub-frame 302 comprises two slots 303 in the time direction. Each slot 303 comprises seven symbol periods 304. Therefore, each sub-frame 302 comprises 14 symbol periods 304 in the time direction. This symbol period 304 may be one symbol period of an OFDM symbol in the downlink communication of the OFDMA method, or may be one symbol period of a DFTS OFDM symbol in the uplink communication of the SC-FDMA method.

The TDD frame 300 comprises the sub-frames 302 dedicated for uplink communication and the sub-frames 302 dedicated for downlink communication. Hereinafter, the sub-frame 302 dedicated for uplink communication is referred to as the "uplink sub-frame 302" and the sub-frame 302 dedicated for downlink communication is referred to as the "downlink sub-frame 302."

With regard to the LTE, the area (the wireless resource) comprising the frequency bandwidth of 180 kHz in the frequency direction and seven symbol periods 304 (one slot 303) in the time direction for the TDD frame 300 is referred to as a "resource block (RB)." The resource block comprises 12 subcarriers. The uplink wireless resource and the downlink wireless resource are allocated in units of one resource block with respect to the mobile phone 2 in the wireless resource allocation module 122.

The SC-FDMA method is used in uplink communication; therefore, when the plurality of resource blocks are allocated with respect to one mobile phone 2 in one slot 303 of the uplink sub-frame 302, the plurality of resource blocks continued in the frequency direction are allocated to this mobile phone 2. Hereinafter, the frequency band for one resource block is referred to as an "allocation unit band." If the plurality of resource blocks are allocated with respect to the mobile phone 2, the plurality of allocation unit bands are allocated with respect to the mobile phone 2.

In the LTE, the configuration of the TDD frame 300 is defined into seven types of configurations in which the combination of the uplink sub-frame 302 and the downlink sub-frame 302 varies. FIG. 4 is a diagram showing the seven types of configurations.

FIG. 4 an illustration of an exemplary table showing seven sub-frame configurations. In the LTE, the 0th to 6th configurations of the TDD frames 300 are defined. In the communication environment 100, at least one of these configurations may be used. In FIG. 4, the sub-frame 302 indicated by "D" means the downlink sub-frame 302 and the sub-frame 302 indicated by "U" means the uplink sub-frame 302. The sub-frame 302 indicated in "S" means the sub-frame 302 in which switching from downlink communication to uplink communication is performed at the communication environment 100. This sub-frame 302 is referred to as the "special sub-frame 302."

For example, in the TDD frame 300 comprising the 0th configuration, the 0th and 5th sub-frames 302 are the downlink sub-frames 302, the 2nd to the 4th sub-frames 302 and the 7th to the 9th sub-frame 302 are the uplink sub-frames 302, and the 1st and the 6th sub-frames 302 are the special sub-frames 302. In the TDD frame 300 comprising the 4th configuration, the 0th sub-frame 302 and the 4th to 9th sub-frames 302 are the downlink sub-frames 302, the 2nd and 3rd sub-frames 302 are the uplink sub-frame 302, and the 1st sub-frame 302 is the special sub-frame 302.

Figure 5:
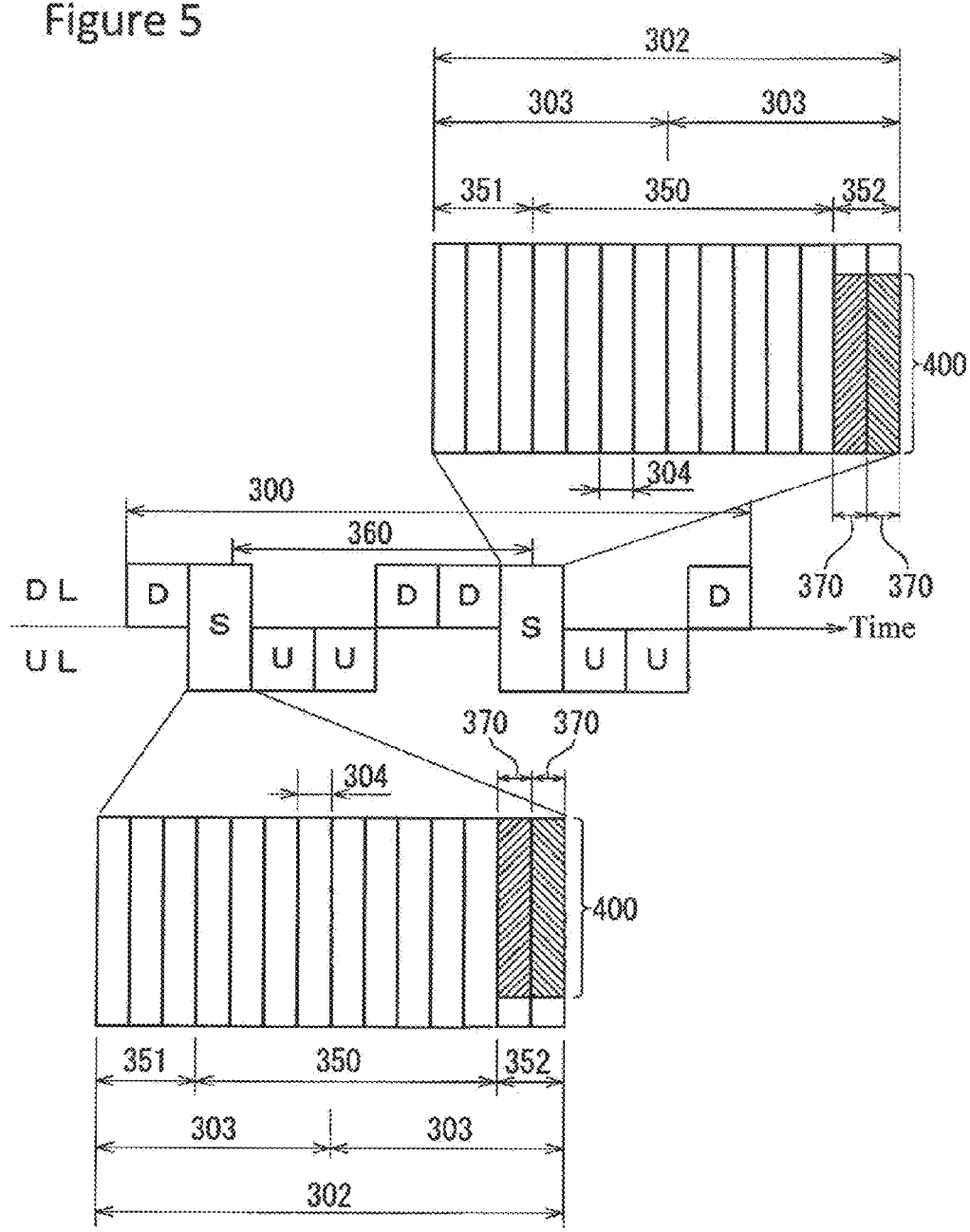
FIG. 5 is an illustration of an exemplary diagram showing the TDD frame of FIG. 3 in more detail.

FIG. 5 is an illustration of an exemplary diagram showing the TDD frame 300 of FIG. 3 in more detail comprising the 1st configuration. As shown in FIG. 5, the special sub-frame 302 comprises a downlink pilot time slot (DwPTS) 351, a guard time (GP) 350, and an uplink pilot time slot (UpPTS) 352 in the time direction. The guard time 350 requires no signal period to switch from the downlink communication to the uplink communication and is not used for communications. Hereinafter, the TDD frame 300 comprising the 1st configuration is used in the system 200.

In the LTE, various types of combinations are defined regarding a duration of the downlink pilot time slot 351, the guard time 350, and the uplink pilot time slot 352. In the example in FIG. 5, the duration of the downlink pilot time slot 351 is set by three symbol periods 304 and the duration of the uplink pilot time slot 352 is set by two symbol periods 304.

At the system 200, not only is it possible to carry out downlink communication in the downlink sub-frame 302, it is also possible to carry out downlink communication in the downlink pilot time slot 351 of the special sub-frame 302. In the communication environment 100, not only is it possible to carry out uplink communication in the uplink sub-frame 302, it is also possible to carry out uplink communication in the uplink pilot time slot 352 of the special sub-frame 302.

The base station 1/system 200 transmits data to the mobile phone 2 in each symbol period 304 of the downlink pilot time slot 351. The mobile phone 2 transmits known signals referred to as "sounding reference signals (SRSs)" to the base station 1 in the symbol period 304 comprising the uplink pilot time slot 352. The SRSs may comprise a plurality of complex signals (complex symbols) that modulate the plurality of subcarriers. The symbol pattern the plurality of complex signals comprising the SRS is already known at the base station 1. Hereinafter, the complex signals comprising the SRS are referred to as "SRS complex signals."

In the LTE, the SRS may be used when the quality of uplink communication is defined. In one embodiment, the base station 1 uses the SRS transmitted in the uplink pilot time slot 352 in order to calculate the transmission weight. That is, the base station 1 controls the transmission directionality of the array antenna 110, based on the SRS transmitted by the mobile phone 2 at the uplink pilot time slot 352.

The reception weight set with respect to the received signals comprising user data transmitted from the mobile phone 2 may be calculated based on known signals referred to as demodulation reference signals (DRS) transmitted by the mobile phone 2 in the uplink sub-frame 302, rather than calculated based on the SRS.

The SRS may be transmitted during the final symbol period 304 of the uplink sub-frame 302. In one embodiment, unless otherwise mentioned, the SRS refers to the SRS transmitted using the uplink pilot time slot 352. The SRS is transmitted by each uplink pilot time slot 352 of the special sub-frame 302; therefore, the tip of the uplink pilot time slot 352 of the special sub-frame 302 to the tip of the uplink pilot time slot 352 of the subsequent special sub-frame 302 may be referred to as an "SRS transmission cycle 360."

Each symbol period 304 comprising the uplink pilot time slot 352 is referred to as a "SRS transmission symbol period 370." Each mobile phone 2 can transmit the SRS using at least one of the two SRS transmission symbol periods 370 comprising the uplink pilot time slot 352 at each special sub-frame 302 (by each SRS transmission cycle 360).

<Transmission Frequency Band of the SRS>

In the system 200, an alternate appearance is made by the special sub-frame 302 in which the frequency band 400 (hereinafter referred to as "SRS transmittable band 400") that can be used for transmitting the SRS is disposed in the vicinity of the high frequency side of the system bandwidth and the special sub-frame 302 in which the SRS transmittable band 400 is disposed in the vicinity of the low frequency side of the system bandwidth. That is, the SRS transmittable band 400 is disposed alternately on the high frequency side and the low frequency side of the system bandwidth by each SRS transmission cycle 360. In FIG. 5, the SRS transmittable band 400 is indicated by diagonal lines.

In the communication environment 100 according to the present embodiment, the frequency band one mobile phone 2 uses changes in each special sub-frame 302 (by each SRS transmission cycle 360) within the SRS transmittable band 400 for the transmission of the SRS (hereinafter referred to as "SRS transmission band"), and as one mobile phone 2 transmits the SRS a plurality of times, the SRS is transmitted across the entire bandwidth of the SRS transmittable band 400. This action is referred to as a "frequency hopping."

Figure 6:
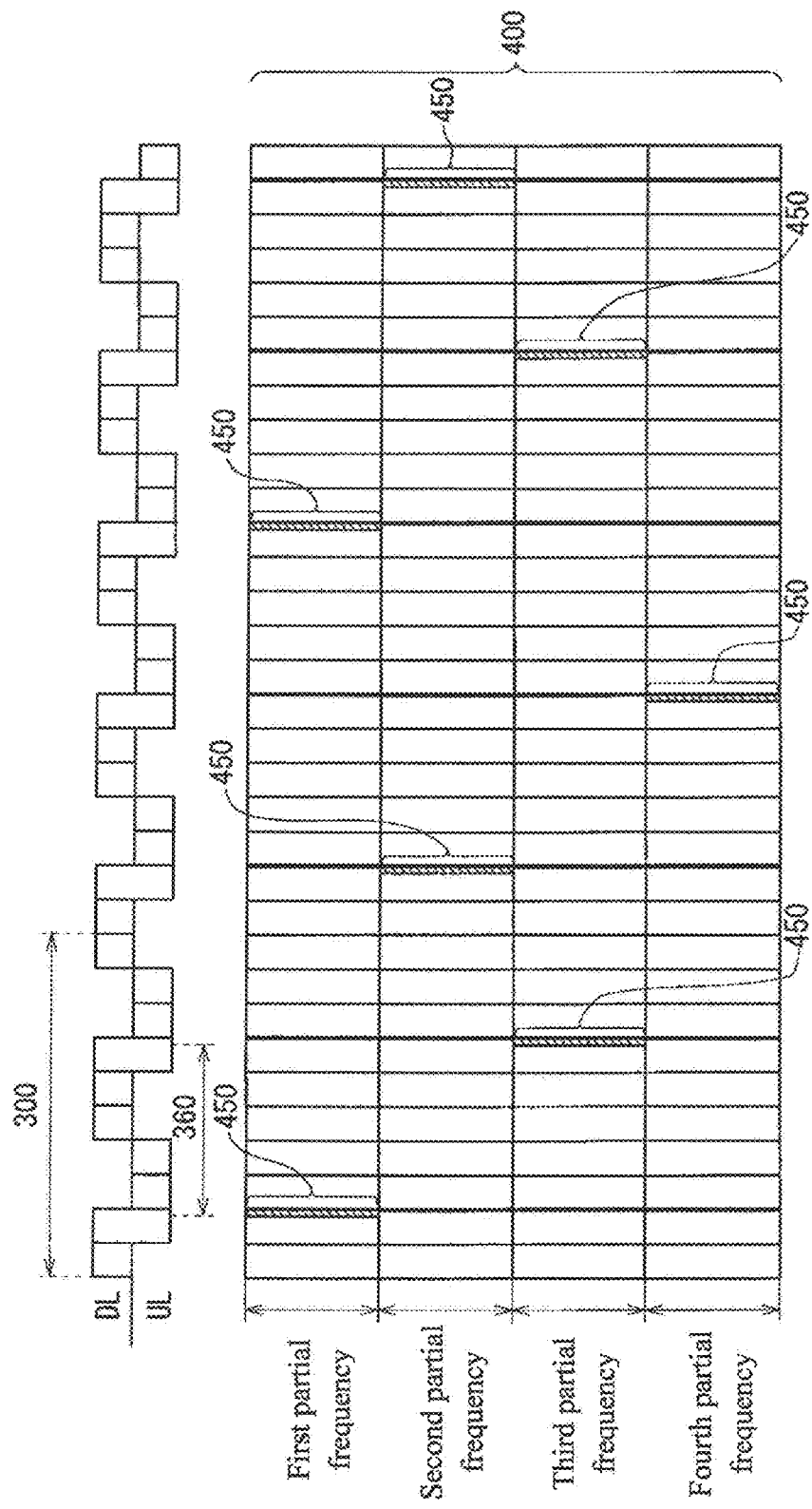
FIG. 6 is an illustration of an exemplary diagram showing frequency hopping of a Surrounding Reference Signal (SRS) transmission band.

FIG. 6 is an illustration of an exemplary diagram showing frequency hopping of a Surrounding Reference signal (SRS) transmission band. FIG. 6 shows one example in which the SRS transmission band 450 used by one mobile phone 2 performs frequency-hopping. In FIG. 6, the SRS transmittable band 400 is divided into first to fourth frequency bands. The SRS transmission band 450 is sequentially set to any one of the first to fourth frequency bands. For example, the SRS transmission band 450 comprising a quarter bandwidth of the bandwidth of the SRS transmittable band 400 changes sequentially by each SRS transmission cycle 360 into the first partial frequency band, the third partial frequency band, the second partial frequency band, and the fourth partial frequency band.

The width of each of the first to fourth partial frequency bands is set, for example, to the frequency bandwidth for 24 resource blocks, that is, the width is set to 24 times the width of the allocation unit band. Hereinafter, if it is not particularly necessary to distinguish the first to fourth partial frequency bands, each is referred to as a "partial frequency band." The cycle in which the SRS transmission band 450 changes briefly across the entire area of the SRS transmittable band 400 is referred to as a "hopping cycle." In the example in FIG. 6, the hopping cycle is constituted from four SRS transmission cycles 360. Consequently, after the four SRS transmission cycles 360 pass through, the SRS is transmitted across the entire area of the SRS transmittable band 400.

At the base station 1, the wireless resource allocation module 122 allocates a variety of information necessary to transmit the SRS to each mobile phone 2, which is the communication target. For example, the wireless resource allocation module 122 allocates the bandwidth of the SRS transmission band (hereinafter referred to as the SRS transmission band), the SRS transmission symbol period 370, and the frequency hopping method of the SRS transmission band (how to change the SRS transmission band) to each mobile phone 2. The SRS transmission bandwidth may match the width of the above partial frequency band. If the SRS transmission bandwidth changes, the hopping cycle may also change.

The transmitted signal generation module 120 generates transmitted signals comprising control signals for notifying the mobile phone 2 of the SRS transmission bandwidth, allocated to the mobile phone 2. These signals are transmitted from the communication module 13 to the mobile phone 2. Each mobile phone 2 can recognize the SRS transmission bandwidth allocated to itself, the SRS transmission symbol period 370, and the frequency hopping method of the SRS transmission band. Each mobile phone 2 transmits the SRS for each SRS transmission cycle 360 based on the SRS transmission bandwidth, etc., allocated to itself.

The above control signals are referred to as "RRC Connection Reconfiguration Messages" in the LTE. Various parameters for notifying the mobile phone 2 of the SRS transmission bandwidth, etc., are defined in the LTE. For example, the SRS transmission bandwidth is determined by a parameter CSRS referred to as a "srs-Bandwidth Config" and a parameter BSRS referred to as a "srs-Bandwidth." The base station 1 can notify the mobile phone 2 of the SRS transmission bandwidth by notifying the mobile phone 2 of the values of the CSRS and BSRS parameters.

<Base Station Action when the Transmission Weight is set Based on the Transmitted Signals>

Next, an explanation is provided regarding the action for cases in which the transmission weight is set with respect to the transmitted signals that the base station 1 should transmit to the mobile phone 2. Hereinafter, the mobile phone 2 which will be explained may be referred to as the "target mobile phone 2."

At the base station 1, regarding the transmitted signals transmitted to the target mobile phone 2 in one SRS transmission cycle 360, the transmission weight is calculated based on the SRS that the target mobile phone 2 transmits in the SRS transmission cycle 360 as well as the SRS in which the frequency band of the transmitted signals is comprised in the transmission frequency band (the transmission weight may also be calculated based on the reception weight calculated based on the SRS), and the transmission weight is set to the transmitted signals.

For example, regarding the signals transmitted to a first mobile phone 2 in the first SRS transmission cycle 360, the base station 1 calculates the transmission weight based on the SRS that the first mobile phone 2 transmits in the first SRS transmission cycle 360 as well as the SRS transmitted in the transmission frequency band comprising the frequency band of the signals transmitted to the first mobile phone 2. That is, the frequency band of the signals transmitted to the first mobile phone 2 in the first SRS transmission cycle 360 is comprised in the transmission frequency band the first mobile phone uses in order to transmit the SRS in the first SRS transmission cycle 360.

In the SRS transmission cycle 360 in which the signals are transmitted from the base station 1 to the mobile phone 2, if the SRS comprising the frequency band of the transmitted signals in the transmission frequency band is not transmitted from the mobile phone 2, the transmission weight, calculated based on the SRS transmitted from the mobile phone 2 in the SRS transmission cycle 360 preceding the SRS transmission cycle 360 with respect to the SRS transmission cycle 360 and located as close as the SRS transmission cycle 360 as well as the SRS comprising the frequency band of the transmitted signals in the transmission frequency band, is set to the transmitted signals.

For example, if the transmission frequency band of the SRS transmitted by the first mobile phone 2 in the second SRS transmission cycle 360, which is the preceding cycle with respect to the first SRS transmission cycle 360, comprises the frequency band of the signals transmitted to the first mobile phone 2 in the first SRS transmission cycle 360, the base station 1 calculates the transmission weight of the transmitted signals based on the SRS signals transmitted in the second SRS transmission cycle 360.

If the transmission frequency band of the SRS that the first mobile phone 2 transmits in the third SRS transmission cycle 360, which is the preceding cycle with respect to the second SRS transmission cycle 360, comprises the frequency band of the signals transmitted to the second mobile phone 2 in the first SRS transmission cycle 360, the base station 1 calculates the transmission weight of the transmitted signals based on the SRS signals transmitted in the third SRS transmission cycle 360.

If the frequency band of the signals transmitted to the first mobile phone 2 in the first SRS transmission cycle 360 is not comprised in the transmission frequency band the first mobile phone uses in order to transmit the SRS in the first SRS transmission cycle 360, the base station 1 may create the transmission weight, using the SRS transmitted from the first mobile phone 2 in the preceding cycle with respect to the first SRS transmission cycle 360 as well as the SRS in which the transmission frequency band of the SRS comprises the frequency band of the signals transmitted to the first mobile phone 2 in the first SRS transmission cycle 360.

An explanation is provided below regarding a detailed example of the setting method of the transmission weight with respect to the transmitted signals, with reference to FIG. 7.

Figure 7:
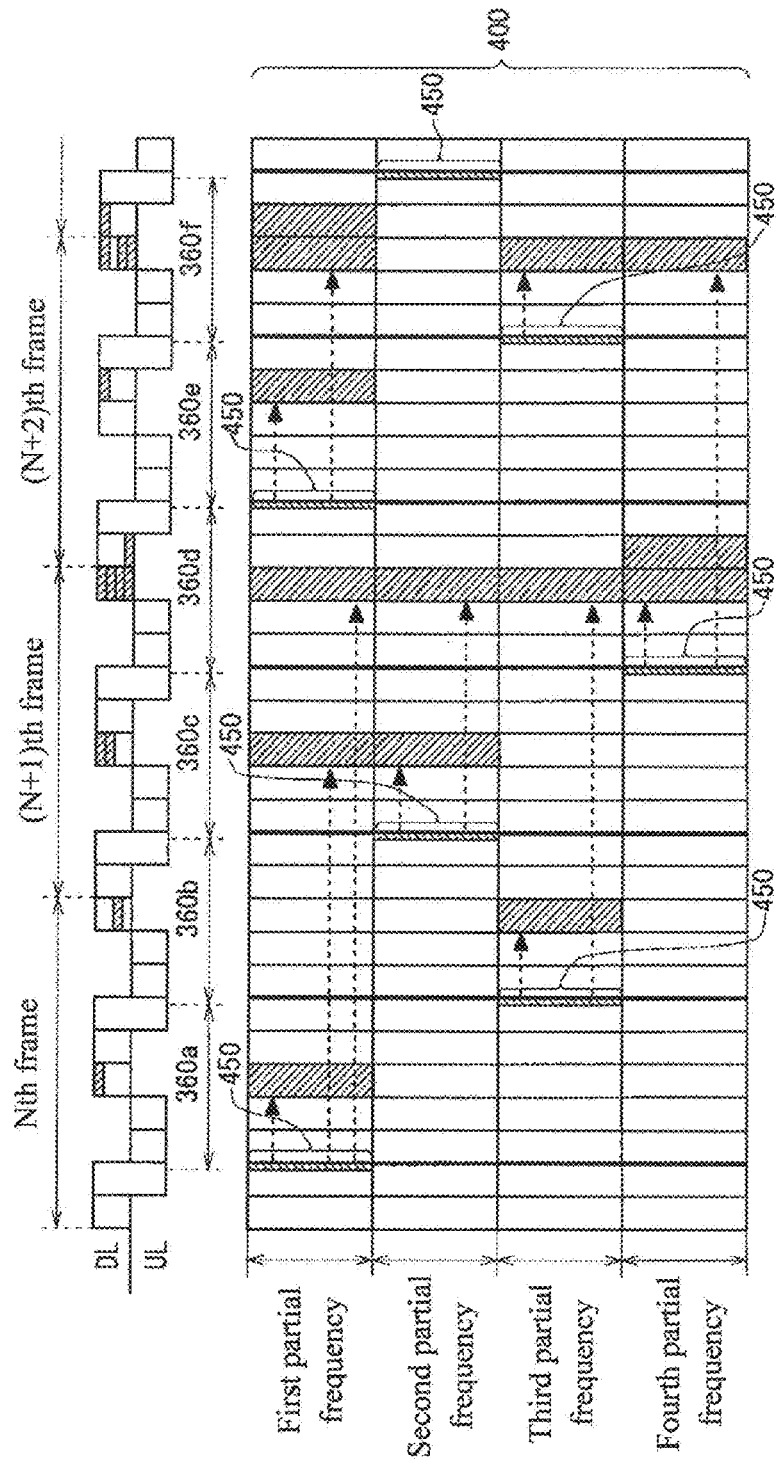
FIG. 7 is an illustration of an exemplary diagram showing a setting method of a transmission weight of transmitted signals.

FIG. 7 is an illustration of an exemplary diagram showing a setting method of a transmission weight of transmitted signals. FIG. 7 provides an allocation example of the downlink wireless resource with respect to the target mobile phone 2. The downlink wireless resource allocated to the target mobile phone 2 in the wireless resource allocation module 122 is shown in diagonally downward lines. Six SRS transmission cycles 360 appearing in the (N+2)th TDD frame 300 from the Nth TDD frame 300 are referred to as SRS transmission cycles 360a to 360f in order from the foremost SRS transmission cycle.

For example, regarding the transmitted signals of the first partial frequency band transmitted to the target mobile phone 2 in the SRS transmission cycle 360a, the transmission weight is calculated based on the SRS transmitted from the target mobile phone 2 in the SRS transmission cycle 360a as well as the SRS in which the first partial frequency band is the SRS transmission band 450, setting the calculated transmission weight to the transmitted signals.

Regarding the transmitted signals of the third partial frequency band transmitted to the target mobile phone 2 in the SRS transmission cycle 360b, the transmission weight is calculated based on the SRS transmitted from the target mobile phone 2 in the SRS transmission cycle 360b as well as the SRS in which the third partial frequency band is the SRS transmission band 450, setting the calculated transmission weight to the transmitted signals.

Regarding the transmitted signals of the fourth partial frequency band transmitted to the target mobile phone 2 in the SRS transmission cycle 360d (the transmitted signals of the fourth partial frequency band transmitted in the 9th sub-frame of the (N+1)th TDD frame 300 and the transmitted signals of the fourth partial frequency band transmitted in the 0th sub-frame of the (N+2)th TDD frame 300), the transmission weight is calculated based on the SRS transmitted from the target mobile phone 2 in the SRS transmission cycle 360d as well as the SRS in which the fourth partial frequency band is the SRS transmission band 450, setting the calculated transmission weight to the transmitted signals.

In contrast, for example, regarding the transmitted signals of the first partial frequency band, which are the signals transmitted to the target mobile phone 2 in the SRS transmission cycle 360c, since the SRS in which the first partial frequency band is the SRS transmission band 450 is not transmitted from the target mobile phone 2 in the SRS transmission cycle 360c, the transmission weight calculated based on the SRS transmitted from the target mobile phone 2 in the preceding the SRS transmission cycle 360a with respect to the SRS transmission cycle 360c as well as the SRS in which the first partial frequency band is the SRS transmission band 450 is set to the transmitted signals.

Regarding the transmitted signals of the first partial frequency band transmitted to the target mobile phone 2 in the SRS transmission cycle 360d, since the SRS in which the first partial frequency band is the SRS transmission band 450 is not transmitted from the target mobile phone 2 in the SRS transmission cycle 360d, the transmission weight calculated based on the SRS transmitted from the target mobile phone 2 in the preceding SRS transmission cycle 360a with respect to the SRS transmission cycle 360d as well as the SRS in which the first partial frequency band is the SRS transmission band 450, is set to the transmitted signals.

Regarding the transmitted signals of the second partial frequency band transmitted to the target mobile phone 2 in the SRS transmission cycle 360d, since the SRS in which the second partial frequency band is the SRS transmission band 450 is not transmitted from the target mobile phone 2 in the SRS transmission cycle 360d, the transmission weight calculated based on the SRS transmitted from the target mobile phone 2 in the preceding SRS transmission cycle 360c with respect to the SRS transmission cycle 360d as well as the SRS in which the second partial frequency band is the SRS transmission band 450 is set to the transmitted signals.

Regarding the transmitted signals of the first partial frequency band transmitted to the target mobile phone 2 in the SRS transmission cycle 360f (the transmitted signals of the first partial frequency band transmitted in the 9th sub-frame of the (N+2)th TDD frame 300 and the transmitted signals of the first partial frequency band transmitted in the 0th sub-frame of the subsequent TDD frame 300), since the SRS in which the first partial frequency band is the SRS transmission band 450 is not transmitted from the target mobile phone 2 in the SRS transmission cycle 360f, the transmission weight calculated based on the SRS transmitted from the target mobile phone 2 in the preceding SRS transmission cycle 360e with respect to the SRS transmission cycle 360f as well as the SRS in which the first partial frequency band is the SRS transmission band 450 is set.

For example, if the frequency band of the signals transmitted using the first partial frequency band in the SRS transmission cycle 360c and the frequency band of the signals transmitted using the first partial frequency band in the SRS transmission cycle 360a match, it is not necessary to calculate the transmission weight in the SRS transmission cycle 360c. Therefore, the transmission weight calculated for the transmitted signals in the SRS transmission cycle 360a may be set to the transmitted signals in the SRS transmission cycle 360c.

In contrast, as opposed to FIG. 7, if the frequency band of the signals transmitted using the first partial frequency band in the SRS transmission cycle 360c and the frequency band of the signals transmitted using the first partial frequency band in the SRS transmission cycle 360a are different, it is not possible to set the transmission weight calculated for the transmitted signals in the SRS transmission cycle 360a to the transmitted signals in the SRS transmission cycle 360c. The transmission weight set to the signals transmitted to the target mobile phone 2 in the SRS transmission cycle 360c may be newly calculated based on the SRS transmitted from the target mobile phone 2 in the SRS transmission cycle 360a.

At the control module 12, if the transmission weight set to the transmitted signals that should be transmitted to the mobile phone 2 is calculated, first, at the reception weight processing module 124, the reception weight may be calculated based on the plurality of SRS complex signals transmitted using the same the frequency band as the frequency band of the transmitted signals, among the plurality of SRS complex signals comprising the SRS used in order to calculate the transmission weight. Subsequently, at the transmission weight processing module 123, the transmission weight may be calculated based on the reception weight calculated at the reception weight processing module 124.

At the control module 12, the transmission weight may be calculated, for example, by each allocation unit band. For example, if the frequency band of the signals transmitted to the target mobile phone 2 is constituted by four allocation unit bands, the transmission weight may be calculated regarding each of the four allocation unit bands. The transmission weight set to the signals transmitted to the target mobile phone 2 using the first allocation unit band is calculated based on twelve SRS complex signals transmitted using the predefined allocation unit band, among the plurality of SRS complex signals comprising the SRS received from the target mobile phone 2. Since twelve subcarriers are comprised in one resource block, the mobile phone 2 can transmit twelve complex signals using one allocation unit band.

If the transmission weight set with respect to the signals transmitted to the target mobile phone 2 using the first allocation unit band is calculated, first, the reception weight processing module 124 updates the reception weight twelve times based on twelve SRS complex signals transmitted using the first allocation unit band, using a sequential estimation algorithm such as a Recursive Least Squares (RLS) algorithm. The transmission weight processing module 123 calculates the transmission weight based on the reception weight upon completion of the update. Based on this, both the beam forming and null steering are carried out regarding the transmission directionality of the array antenna 110 at the communication module 13. At the communication module 13, only beam forming may be performed among the beam forming and null steering regarding the transmission directionality of the array antenna 110.

<Transmitted Power Control>

At the base station 1, if the SRS comprising the frequency band of the transmitted signals transmitted to the first mobile phone 2 in the first SRS transmission cycle 360 in the transmission frequency band is transmitted from the first mobile phone 2 in the first SRS transmission cycle 360, the transmission weight based on the SRS transmitted from the first mobile phone 2 at a timing close to the transmission timing of the transmitted signals is calculated, that is, the transmission weight is calculated based on the new SRS. Therefore, sufficient accuracy of the transmission weight is ensured.

At the base station 1, if the SRS comprising the frequency band of the transmitted signals of the first mobile phone 2 transmitted in the first SRS transmission cycle 360 in the transmission frequency band is not transmitted from the first mobile phone 2 in the first SRS transmission cycle 360, the transmission weight calculated based on the SRS transmitted from the first mobile phone 2 in the preceding SRS transmission cycle 360 with respect to the first SRS transmission cycle 360 is set to the transmitted signals. In this case, the transmission weight set to the transmitted signals is calculated based on the SRS transmitted from the first mobile phone 2 at a timing far from the transmission timing of the transmitted signals, that is, the transmission weight is calculated based on an old SRS. Thereby resulting in cases in which an accuracy of the transmission weight is not sufficiently ensured.

As a result, the signals transmitted from the base station 1 are received at the second mobile phone 2, which is different from the first mobile phone 2, causing a possibility of interference with the second mobile phone 2.

Figure 8:
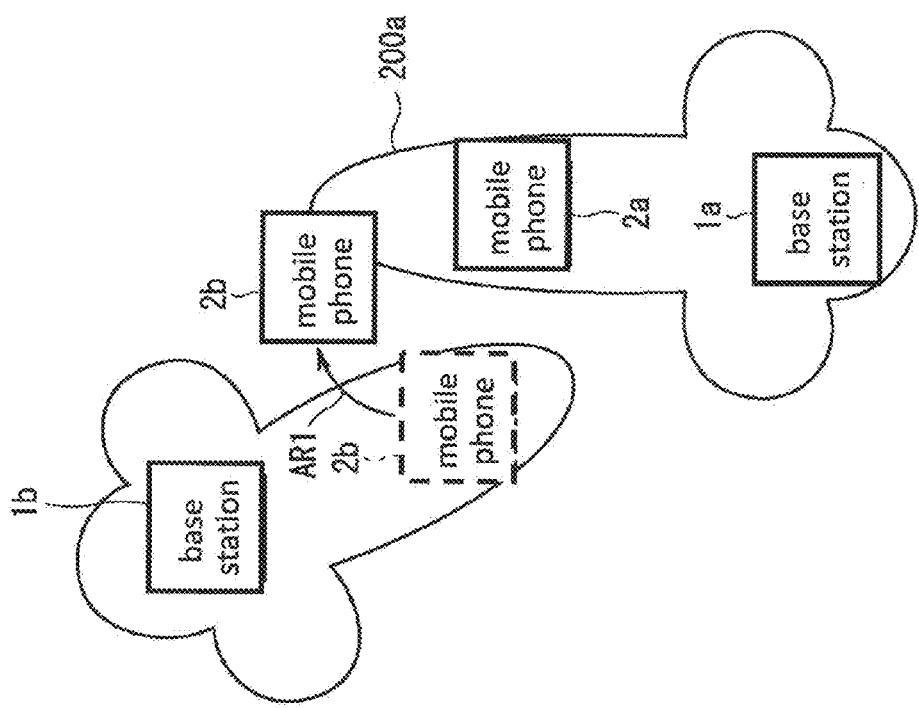
FIG. 8 is an illustration of an exemplary diagram showing a state in which transmitted signals of a base station interfere with a non-destination mobile phone.

FIG. 8 is an illustration of an exemplary diagram showing a state in which transmitted signals of a base station interfere with a non-destination mobile phone. FIG. 8 indicates a state in which a mobile phone 2b that communicates with a base station 1b moves in the direction of an arrow AR1 between a timing in which a base station 1a receives the SRS from a mobile phone 2a (hereinafter simply referred to as the "SRS reception timing") and the timing in which the base station 1a transmits the transmitted signals to the mobile phone 2a (hereinafter simply referred to as the "transmission timing"). In FIG. 8, the position of the mobile phone 2b at the SRS reception timing is indicated by a dotted line and the position of the mobile phone 2b at the transmission timing is indicated by a solid line. In the example in FIG. 8, the mobile phone 2a does not move between the SRS reception timing and the transmission timing.

For cases in which the base station 1a transmits the transmitted signals to the mobile phone 2a, if a beam 200a related to the transmission directionality of the array antenna 110 is controlled based on the SRS from the mobile phone 2a, the beam 200a faces a location of the mobile phone 2a at the SRS reception timing. If the transmission timing is delayed significantly with respect to the SRS reception timing at the base station 1a, the mobile phone 2b (indicated by dotted lines) that did not exist in the direction toward the mobile phone 2a from the base station 1a (the direction in which the beam 200a faces) moves in the direction of the arrow AR1 between the SRS reception timing and the transmission timing at the SRS reception timing, and may enter the beam 200a of the base station 1a at the transmission timing.

As a result, the transmitted signals of the base station 1a transmitted to the mobile phone 2a reach the mobile phone 2b, which is not the destination mobile phone, thereby possibly interfering with the mobile phone 2b. If the mobile phone 2b receives signals of a same frequency band as an interference wave along with the interference wave from the base station 1a, an effect of the interference on the mobile phone 2b is larger.

Therefore, in one embodiment, it is possible to reduce the transmitted power when transmitting the transmitted signals based on a time interval between a reception time and a transmission time. The reception time occurs when the base station 1 receives the SRS, and the transmission time occurs when the transmitted signals are transmitted. The transmitted power can be reduced when transmitting the transmitted signals based on the time interval by controlling the transmission directionality of the array antenna 110 based on the received SRS.

As the transmitted power is controlled, the interference on the mobile phone 2, which is not the destination, is controlled. In one embodiment, the control to reduce the transmitted power is referred to as a "transmitted power reduction control." Next, a detailed explanation is provided regarding transmitted power reduction control.

Figure 9:
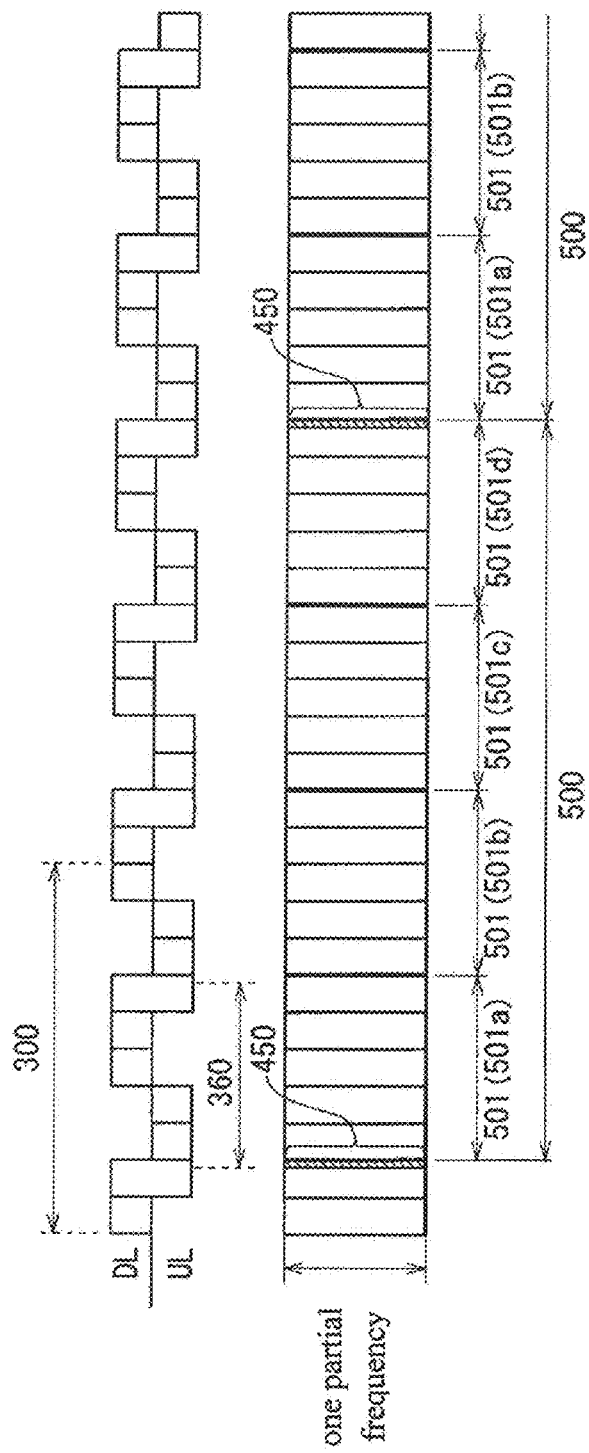
FIG. 9 is an illustration of an exemplary diagram showing a state in which an SRS is transmitted in a partial frequency band.

FIG. 9 is an illustration of an exemplary diagram showing a state in which an SRS is transmitted in a partial frequency band. The partial frequency band may be any one of the first to fourth partial frequency bands. For example, a period 500 between the end of the special sub-frame 302 to which the SRS in which the partial frequency band is the SRS transmission band 450 is transmitted and the end of the special sub-frame 302 to which the SRS is transmitted in the same partial frequency band is subsequently evenly divided into four partial periods 501. The period 500 is equivalent to the period of twenty sub-frames 302. The base station 1 may use the SRS received at the special sub-frame 302 immediately before the period 500 in order to calculate the transmission weight set to the transmitted signals transmitted at the period 500 immediately after receiving the SRS.

The period 500 may be referred to as the "SRS usable period 500" for the SRS transmitted immediately before the period 500. Regarding the first to fourth partial frequency bands, the SRS is transmitted at a different timing from other partial frequency bands. Therefore, the position of the time direction of the SRS usable period 500 varies between the first to fourth partial frequency bands.

The transmitted power reduction control method described herein can control the transmitted power of the transmitted signals according to which partial periods 501 of the SRS usable period 500 the transmission is carried out in. The four partial periods 501 comprising the SRS usable period 500 may be referred to as a first partial period 501a to a fourth partial period 501d in order from the foremost partial period.

The greater the distance between the base station 1 and the mobile phone 2a, the lower the received power of the received signals at the base station 1 received from the mobile phone 2a. For cases in which the received power of the base station 1 is low, if the transmitted power of the transmitted signals that should be transmitted to the mobile phone 2a is reduced, the transmitted signals may not reach the mobile phone 2a. The base station 1 does not carry out transmitted power reduction control of the transmitted signals that should be transmitted to the mobile phone 2a if the received power of the received signals at the base station 1 received from the mobile phone 2a is lower than the threshold.

FIG. 10 is an illustration of an exemplary flowchart showing a transmission power reduction control process 1000 (process 1000) that can be performed by the base station 1 according to an embodiment of the disclosure. The various tasks performed in connection with process 1000 may be performed, by software, hardware, firmware, a computer-readable medium having computer executable instructions for performing the process method, or any combination thereof. The process 1000 may be recorded in a computer-readable medium such as a semiconductor memory, a magnetic disk, an optical disk, and the like, and can be accessed and executed, for example, by a computer CPU such as the control module 12 in which the computer-readable medium is stored.

It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein. For illustrative purposes, the following description of process 1000 may refer to elements mentioned above in connection with FIGS. 1-9. In practical embodiments, portions of the process 1000 may be performed by different elements of the system 200 such as: the antennas 110a, the wireless processing module 11, the control module 12, etc. Process 1000 may have functions, material, and structures that are similar to the embodiments shown in FIGS. 1-9. Therefore common features, functions, and elements may not be redundantly described here.

An explanation is provided regarding one partial frequency band among the first to fourth partial frequency bands shown above. The process 1000 shows a transmission power reduction control that can be performed by the base station 1/system 200 when the transmitted signals are transmitted to a target mobile phone 2 that transmits the SRS in which the partial frequency band is the SRS transmission band 450, at one downlink sub-frame 302 at the SRS usable period 500 corresponding to the SRS.

The partial frequency band is referred to as the "target partial frequency band," and the SRS in which the target partial frequency band is the SRS transmission band 450 may be referred to as the "target SRS." The SRS usable period 500 corresponding to the target SRS may be referred to as the "target SRS usable period 500," and the transmitted signals to which the transmission weight calculated based on the target SRS is set may be referred to as "target transmitted signals."

At task s1, the received power acquisition module 126 calculates the received power of the target SRS received at the array antenna 110. For example, the received power acquisition module 126 calculates a sum of a size of the SRSs complex signals comprising the target SRS of each of the target SRS received at the antennas 110a. The received power acquisition module 126 may add the sum calculated regarding the target SRS received at each of the plurality of antennas 110a and may refer to the value obtained as the received power of the target SRS received at the array antenna 110.

Next, at task s2, the reception weight processing module 124 calculates the reception weight based on the target SRS.

Next, at task s3, the transmitted power control module 125 determines whether or not the transmission period of the target transmitted signals transmitted at the target SRS usable period 500 belongs to the first partial period 501a. The transmission period of the target transmitted signals may be determined at the wireless resource allocation module 122.

If it is determined at task s3 that the transmission period of the target transmitted signals belongs to the first partial period 501a, the transmitted power control module 125 determines at task s4 not to carry out transmitted power reduction control of the target transmitted signals. If the target transmitted signals are transmitted at the first partial period 501a, the target transmitted signals are transmitted at a timing close to the reception timing of the target SRS. As a result, the transmission weight set to the target transmitted signals becomes more accurate.

In this case, it is not necessary to carry out transmitted power reduction control when the target transmitted signals are transmitted. For example, transmitted power reduction control may not be carried out for the signals transmitted at the SRS transmission period 360a as well as for the transmitted signals in which the first partial frequency band is the SRS transmission band 450. Transmitted power reduction control is also not carried out for the signals transmitted at the SRS transmission period 360b as well as for the transmitted signals in which the third partial frequency band is the SRS transmission band 450.

If task s4 is executed, the transmission weight processing module 123 calculates the transmission weight based on the reception weight at task s5, and sets the calculated transmission weight to the target transmitted signals. At task s6, the communication module 13 transmits the target transmitted signals to which the transmission weight is set from the array antenna 110.

If it is determined at task s3 that the transmission period of the target transmitted signals does not belong to the first partial period 501a, the transmitted power control module 125 determines at task s7 whether or not the received power calculated at task s1 is lower than the threshold. If the transmitted power control module 125 determines that the received power is lower than the threshold, it executes task s4 and determines not to carry out transmitted power reduction control with respect to the target transmitted signals. Subsequently, tasks s5 and s6 are executed and the target signals are transmitted from the array antenna 110.

If the transmitted power control module 125 determines at task s7 that the received power calculated at task s1 is equal to or higher than the threshold, at task s8, the transmitted power of the target transmitted signals is determined according to the transmission period of the target transmitted signals.

At task s8, if the transmitted power of the target transmitted signals is set as W0 for cases in which transmitted power reduction control is not carried out, for example, for cases in which the transmission period of the target transmitted signals belongs to the second partial period, the transmitted power control module 125 sets the transmitted power of the target transmitted signals as $(3/4) \times W0$, for cases in which the transmission period of the target transmitted signals belongs to the third partial period, the transmitted power control module 125 sets the transmitted power of the target transmitted signals as $(2/4) \times W0$, and for cases in which the transmission period of the target transmitted signals belongs to the fourth partial period, the transmitted power control module 125 sets the transmitted power of the target transmitted signals as $(1/4) \times W0$.

For example, for the transmitted power of the signals transmitted in the SRS transmission period 360d as well as the transmitted power of the transmitted signals in which the second partial frequency band is the SRS transmission band 450, it is determined as $(3/4) \times W0$. The transmitted power of the signals transmitted in the SRS transmission period 360d as well as the transmitted power of the transmitted signals in which the third partial frequency band is the SRS transmission band 450, is determined as $(2/4) \times W0$. The transmitted power of the signals transmitted in the SRS transmission period 360d as well as the transmitted power of the transmitted signals in which the first partial frequency band is the SRS transmission band 450, is determined as $(1/4) \times W0$.

If the transmitted power control module 125 determines the transmitted power of the target transmitted signals, it reduces the amplification factor of the respective corresponding plurality of transmission amplifiers of the plurality of antennas 110a based on the determined transmitted power. The transmitted power control module 125 may evenly reduce the amplification factor of the plurality of transmission amplifiers such that the transmitted power of each of the transmitted signals (the target signals) transmitted from each of the antennas 110a is evenly reduced. Subsequently, tasks s5 and s6 are carried out at the base station 1. Accordingly, the target transmitted signals are transmitted from the array antenna 110 at the transmitted power corresponding to the transmission period.

FIG. 11 is an illustration of an exemplary table showing a relationship between a transmission period, a received power, and a transmitted power. FIG. 11 shows the relationship between the transmission period of the target transmitted signals, the received power of the received signals from the target mobile phone 2, and the transmitted power of the target transmitted signals. If the received power of the received signals from the target mobile phone 2 is lower than the threshold, that is, if there is a possibility that the target mobile phone 2 is located at a position relatively far from the base station 1, transmitted power reduction control regarding the target transmitted signals is not executed regardless of the transmission period of the target transmitted signals.

In contrast, if the received power of the received signals from the target mobile phone 2 is equal to or higher than the threshold, the transmitted power is reduced according to the transmission period of the target transmitted signals. That is, if there is a possibility that the target mobile phone 2 is located at a position relatively close to the base station 1, the longer the time interval between the reception time the target SRS is received and the transmission time the target transmitted signals are transmitted, the lower the transmitted power of the target transmitted signals is.

Even if the transmitted power of the target transmitted signals is set as (¼)×W0, the transmitted power of the target transmitted signals may be equal to or higher than for cases in which the array antenna 110 is operated using an omni antenna (cases in which the directionality of the array antenna 110 is not controlled). That is, even if the transmitted power of the target transmitted signals is set as (¼)×W0, the transmitted power of the target transmitted signals may be equal to or higher than the transmitted power for cases in which the base station 1 carries out omni transmission.

As above, the transmitted power is controlled for cases in which the transmitted signals are transmitted according to the time interval between the reception time and a transmission time. The reception time occurs when known-received signals that are used for beam forming are received, and the transmission time occurs when the transmitted signals are transmitted. Therefore, even if the transmission is carried out by performing beam forming based on the old SRS, it is possible to control the interference with the mobile phone 2, which is not the destination mobile phone.

Figure 12:
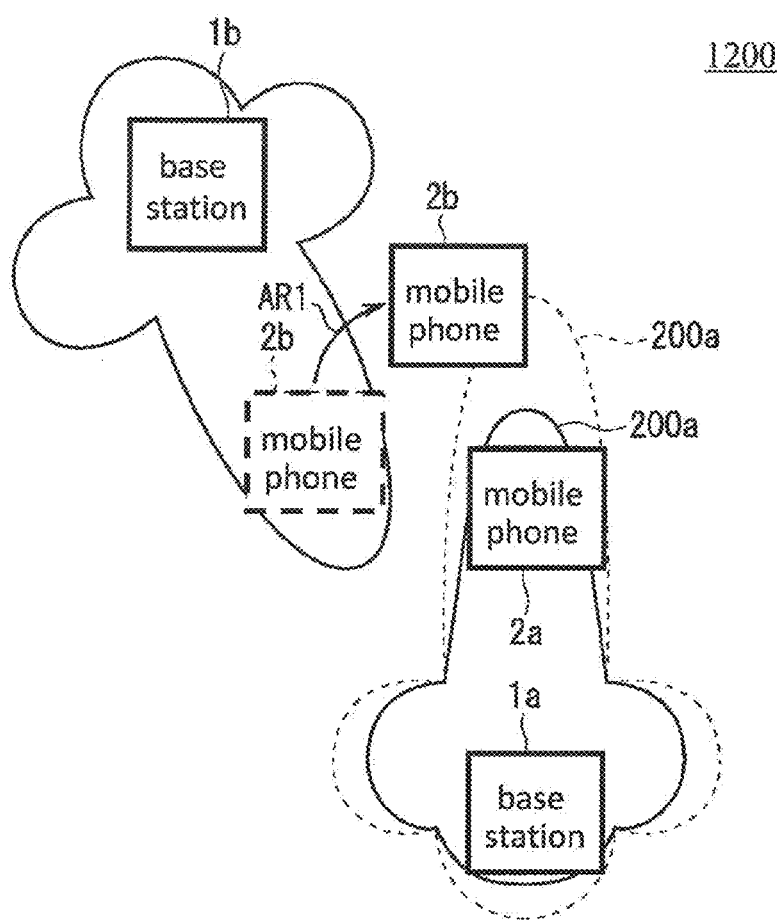
FIG. 12 an illustration of an exemplary communication environment showing a state in which interference at a mobile phone in communication with a base station in its vicinity is controlled by means of a transmitted power reduction control.
Figure 13:
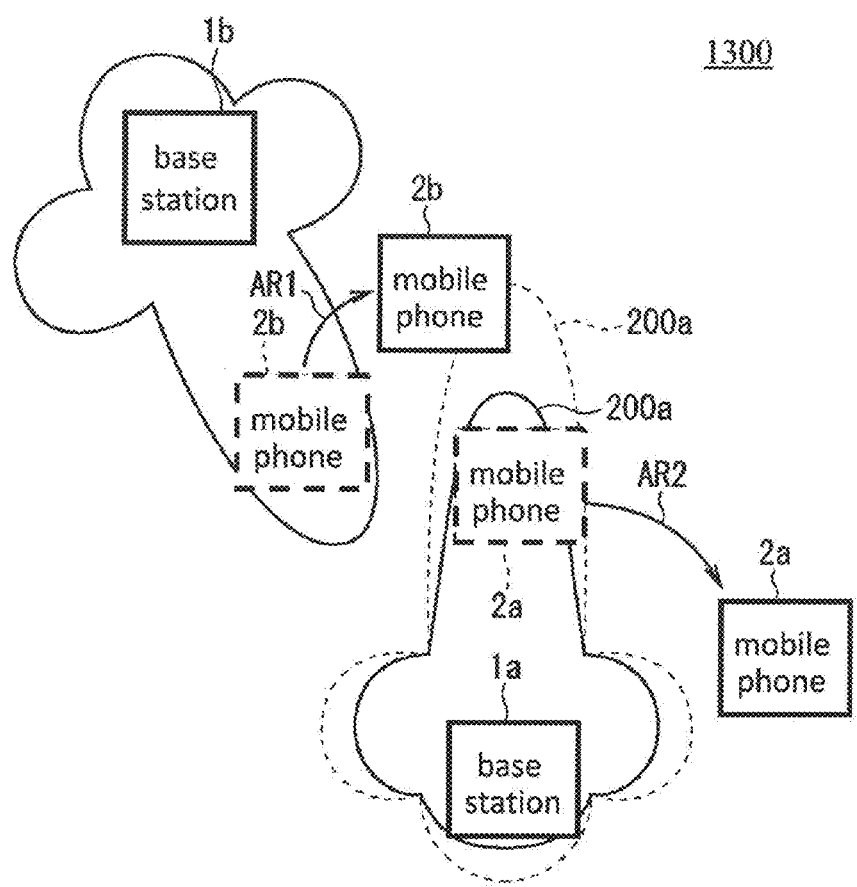
FIG. 13 is an illustration of an exemplary communication environment showing a state in which interference at a mobile phone in communication with a base station in its vicinity is controlled by means of the transmitted power reduction control.

FIG. 12 an illustration of an exemplary communication environment 1200 showing a state in which interference at a mobile phone in communication with a base station in its vicinity is controlled at by means of a transmitted power reduction control. FIG. 13 is an illustration of an exemplary communication environment 1300 showing a state in which interference at a mobile phone in communication with a base station in its vicinity is controlled by means of the transmitted power reduction control.

In FIG. 12, the transmission directionality of the base station 1a for cases in which the transmitted power reduction control is not performed is shown by a dotted line. A distance of the beam 200a related to the transmission directionality of the base station 1a is shortened by means of transmitted power reduction control. The beam 200a does not reach the mobile phone 2b communicating with the base station 1b in its vicinity. Consequently, it is possible to control interference with the mobile phone 2b, which is not the destination mobile.

If the mobile phone 2a does not move between the reception time in which the SRS is received at the base station 1a and the transmission time in which the mobile phone 2a transmits the subsequent SRS, or even if it moves, if the movement is small, it is possible to cause the beam 200a of the base station 1a to reach the mobile phone 2a, even if the base station 1a carries out transmitted power reduction control. In contrast, as shown by the arrow AR2 in FIG. 13, if the mobile phone 2a moves to a greater extent between the time in which the SRS is received at the base station 1a and the time in which the mobile phone 2a transmits the subsequent SRS, the beam 200a of the base station 1a does not reach the mobile phone 2a. However, in either case, it is possible to control interference with the mobile phone 2b by means of transmitted power reduction control.

If the received power of the signals received from the mobile phone 2 is lower, transmitted power reduction control is not carried out, making it possible to prevent the transmitted signals from reaching the mobile phone 2. In terms of controlling interference with the mobile phone 2, which is not the destination mobile phone, transmitted power reduction control may be carried out regarding the transmitted signals that should be transmitted to the mobile phone 2, regardless of the received power of the signals received from the mobile phone 2.

When transmitted power reduction control is carried out, the transmitted power of the transmitted signals from the plurality of antennas 110a comprising the array antenna 110 may be evenly reduced. Therefore, when the transmitted power of the array antenna 110 is reduced, that is, when the transmitted power of the antennas 110a is reduced, it is possible to control the direction of the beams related to the transmission directionality of the array antenna 110 from changing, as shown in FIG. 12. As a result of reducing the transmitted power of the array antenna 110, it is possible to prevent beams from coming off from the mobile phone 2, which is the destination.

The transmitted power is reduced by adjusting the amplification factor of the transmission amplifiers comprising the wireless processing module 11; however, the transmitted power may be reduced by adjusting the amplitude component (size) of the transmission weight expressed in complex numbers. For example, if the transmission weight is calculated based on the reception weight, the transmission weight is adjusted such that the amplitude component of the transmission weight is reduced and the transmission weight after the adjustment is set to the transmitted signals.

At this time, adjustment may be carried out such that the amplitude component of the plurality of transmission weights set respectively to the transmitted signals transmitted from the plurality of antennas 110a is evenly reduced. Accordingly, the transmitted power of the transmitted signals transmitted from each of antennas 110a is evenly reduced, thereby preventing a direction of the beam related to the transmission directionality of the array antenna 110 from changing.

In response to the hopping cycle comprising four SRS transmission cycles 360, the SRS usable period 500 was divided into four partial periods 501; however, it may be divided into two or three partial periods 501, or it may be divided into five or more partial periods 501.

Transmitted power reduction control is not carried out with respect to the signals transmitted from the base station 1 in the partial period 501, which is at the tip of the SRS usable period 500; therefore, if the SRS usable period 500 is divided into two partial periods 501, the transmitted power may be reduced by one phase only. If the SRS usable period 500 is divided into three partial periods 501, the transmitted power may be reduced by two phases only. In general, if the SRS usable period 500 is divided into N (2 or more integers) partial periods 501, the transmitted power may be reduced by (N−1) phases.

At task s7, a fixed threshold is compared to the received power of the SRS, regardless of which partial period 501 the transmission period of the target transmitted signals belongs to among a second partial period 501b to a fourth partial period 501d. If the transmission period of the target transmitted signals is comprised in the second partial period 501b, the reduced amount of transmitted power for cases in which transmitted power reduction control is executed becomes smaller (refer to FIG. 11), compared to cases in which the target transmitted signals are comprised in either the third partial period 501c or the fourth partial period 501d. Consequently, it is possible to cause the target transmitted signals to reach the target mobile phone 2 located at a position distant from the base station 1.

Therefore, at task s7 processed for cases in which the transmission period of the target transmitted signals is comprised in the second partial period 501b, if the same threshold as task s7 processed for cases in which the transmission period of the target transmitted signals is comprised in the third partial period 501c or the fourth partial period 501d is used, even if transmitted power reduction control is executed, transmitted power reduction control is not carried out despite the fact that the target mobile phone 2 is able to receive the target transmitted signals. That is, not carrying out transmitted power reduction control results in a waste.

If the transmission period of the target transmitted signals is comprised in the third partial period 501c, the reduced amount of transmitted power for cases in which transmitted power reduction control is executed is smaller compared to cases in which it is comprised in the fourth partial period 501d. Consequently, it is possible to cause the target transmitted signals to reach the mobile phone 2 located at a position distant from the base station 1. Therefore, at task s7 processed for cases in which the transmission period of the target transmitted signals is comprised in the third partial period 501c, if the same threshold as task s7 processed for cases in which the transmission period of the target transmitted signals is comprised in the fourth partial period 501d is used, even if transmitted power reduction control is executed, transmitted power reduction control is not carried out despite the fact that the target mobile phone 2 is able to receive the target transmitted signals.

Therefore, at task s7, the shorter the time interval is between the reception time in which the target SRS is received and the transmission time in which the target transmitted signals are transmitted, the lower the threshold may be used. The lower the threshold the shorter the time interval between the reception time at which the known-received signals are received from the mobile phone 1 and the transmission time at which the transmitted signals are transmitted to the mobile phone 1. Therefore, the threshold is lowered in response to a shortening of the time interval. Alternatively wherein the time interval is shortened in response to a lowering of the threshold. Accordingly, it is possible to prevent waste of energy from transmitted power reduction control not being carried out.

For example, for cases in which the SRS usable period 500 is divided into the first partial period 501a to the fourth partial period 501d as is the case with one embodiment, thresholds respectively corresponding to the second partial period 501b to the fourth partial period 501d and that are different from each other, namely a first threshold to a third threshold, may be provided. The first threshold may be set so as to be lower than the second threshold and the second threshold may be set so as to be lower than the third threshold. Accordingly, the shorter the time interval is between the time in which the target SRS is received and the time in which the target transmitted signals are transmitted, the lower the threshold is that is used at task s7.

At task s7, the received power of the target SRS power is compared to the threshold corresponding to the partial period 501 to which the transmission period of the target transmitted signals belongs among the first to third thresholds. If the received power is lower than the threshold, transmitted power reduction control is not carried out regarding the target transmitted signals.

FIG. 14 is an illustration of an exemplary table showing a relationship between a transmission period, a received power, and a transmitted power. The diagram shows the relationship between the transmission period of the target transmitted signals, the received power of the received signals from the target mobile phone 2, and the transmitted power of the target transmitted signals.

The shorter the time interval is between the time in which the target SRS is received and the time in which the target transmitted signals are transmitted, the lower the threshold is used; therefore, the smaller the reduced amount of the transmitted power is for cases in which transmitted power reduction control is performed, the more possible it is to reduce the threshold compared to the received power. Consequently, the longer the transmission distance is for cases in which transmitted power reduction control is carried out, the more possible it is to carry out transmitted power reduction control regarding the transmission to the target mobile phone 2 which is located further distant.

Therefore, even if transmitted power reduction control is executed, despite the fact that the mobile phone 2 is able to receive the transmitted signals, it can prevent transmitted power reduction control from not being carried out. That is, it is possible to prevent waste from transmitted power reduction control not being carried out.

The SRS is used as known signals used when calculating the transmission weight; however, other known signals may be used in order to calculate the transmission weight. For example, in the LTE, known signals referred to as demodulation reference signals (DRS) are defined; however, the transmission weight may be calculated based on these known signals. The demodulation reference signals may be used when calculating the reception weight set as the received signals comprising user data.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

In this document, the terms "computer program product", "computer-readable medium", computer-executable instructions and the like may be used generally to refer to media such as, for example, memory, storage devices, or storage unit. These and other forms of computer-readable media may be involved in storing one or more instructions for use by the processor control module 12 to cause the control module 12 to perform specified operations. Such instructions, generally referred to as "computer program code" or "program code" (which may be grouped in the form of computer programs or other groupings), when executed, enable a method of using a system.

The invention claimed is:

1. A communication device comprising:
    a plurality of antennas operable to transmit a plurality of transmitted signals;
    a communication module operable to form a beam based on known-received signals by controlling a transmission directionality of the antennas; and
    a transmitted power control module operable to control a transmitted power of the transmitted signals based on a time interval between a reception time during which the known-received signals are received, and a transmission time during which the transmitted signals are transmitted.

2. The communication device according to claim 1, wherein the transmitted power control module is further operable to evenly reduce transmitted power of each of the transmitted signals transmitted from each of the antennas.

3. The communication device according to claim 1, wherein the transmitted power control module is further operable to control the transmitted power such that the transmitted power is reduced as the time interval increases.

4. The communication device according to claim 3, further comprising a received power acquisition module operable to calculate received power of the known-received signals received at the antennas.

5. The communication device according to claim 4, wherein the transmitted power control module is further operable to:
    compare the received power of the known-received signals to a threshold; and
    prevent power reduction of the transmitted signals to a mobile communication device if the received power is less than the threshold.

6. The communication device according to claim 5, wherein the threshold is lowered in response to a shortening of the time interval.

7. The communication device according to claim 5, wherein the time interval is shortened in response to a lowering of the threshold.

8. The communication device according to claim 1, wherein the known-received signals are received from a mobile communication device.

9. The communication device according to claim 1, wherein the transmitted signals are transmitted to a mobile communication device.

10. A communication method for communicating using a plurality of antennas, the method comprising:
    transmitting a plurality of transmitted signals from the antennas;
    forming a beam based on known-received signals by controlling a transmission directionality of the antennas; and
    controlling a transmitted power of the transmitted signals based on a time interval between: a reception time during which the known-received signals are received, and a transmission time during which the transmitted signals are transmitted.

11. The method according to claim 10, further comprising reducing the transmitted power as the time interval increases.

12. The method according to claim 11, further comprising calculating a received power of the known-received signals received at the antennas.

13. The method according to claim 12, further comprising:
    comparing the received power of the known-received signals to a threshold; and
    preventing power reduction of the transmitted signals to a mobile communication device if the received power is less than the threshold.

14. The method according to claim 13, further comprising lowering the threshold in response to a shortening of the time interval.

15. The method according to claim 13, further comprising shortening the time interval in response to a lowering of the threshold.

16. The method according to claim 10, further comprising receiving the known-received signals from a mobile communication device.

17. The method according to claim 10, further comprising transmitting the transmitted signals to a mobile communication device.

18. The method according to claim 10, further comprising evenly reducing transmitted power of each of the transmitted signals transmitted from each of the antennas.

19. A non-transitory computer readable storage medium comprising computer-executable instructions for performing a method for communicating using a plurality of antennas, the method executed by the computer-executable instructions comprising:
    transmitting a plurality of transmitted signals from the antennas;
    forming a beam based on known-received signals by controlling a transmission directionality of the antennas; and
    controlling a transmitted power of the transmitted signals based on a time interval between: a reception time during which the known-received signals are received, and a transmission time during which the transmitted signals are transmitted.

* * * * *